Jan. 28, 1941.  D. DYRESEN  2,229,802
FASTENER MEMBER AND FASTENER INSTALLATION
Filed April 26, 1938  2 Sheets-Sheet 1

Inventor:
Didrick Dyresen.
by Walter S. Jones
Att'y.

Jan. 28, 1941. D. DYRESEN 2,229,802
FASTENER MEMBER AND FASTENER INSTALLATION
Filed April 26, 1938 2 Sheets-Sheet 2
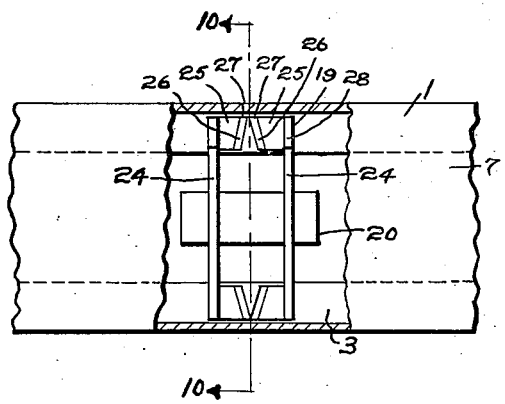
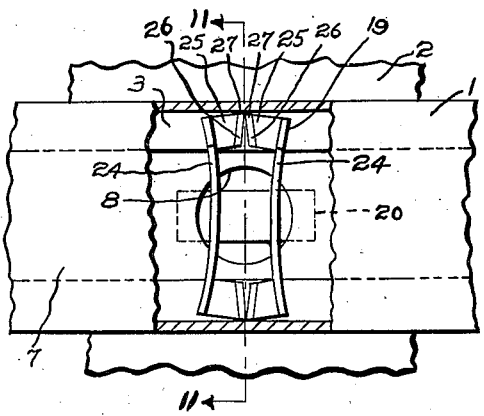
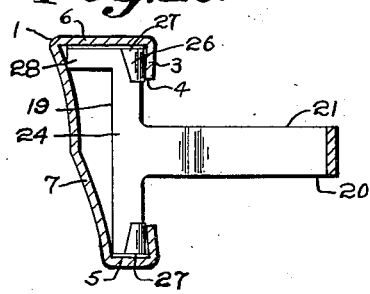
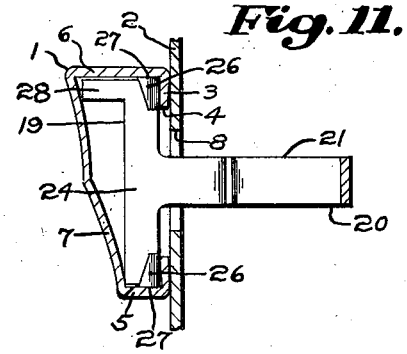
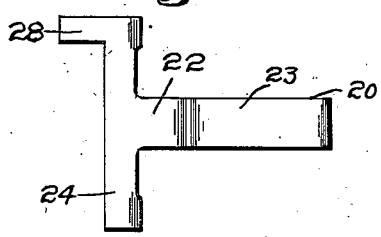
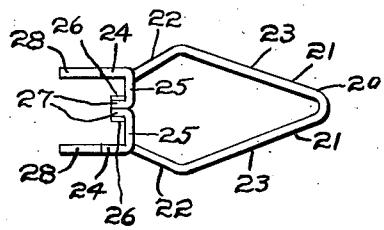
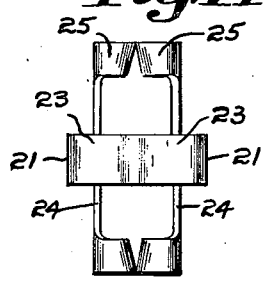
Inventor:
Didrick Dyresen.
by Walter S. Jones
Att'y.

Patented Jan. 28, 1941

2,229,802

UNITED STATES PATENT OFFICE 2,229,802

FASTENER MEMBER AND FASTENER INSTALLATION

Didrick Dyresen, Billerica, Mass.

Application April 26, 1938, Serial No. 204,333

4 Claims. (Cl. 189—88)

My invention aims to provide improvements in fastener secured installations and fasteners for the same.

An object of my invention is the provision of a fastener member adapted for use with an installation comprising a hollow part, such as a molding strip, secured to an apertured supporting part wherein the fastener member has a base portion seated within the hollow part and having parts adapted to expand or elongate when support-engaging legs of the fastener are extended through the aperture of the support so that the base may firmly engage the sides of the hollow part thereby preventing relative movement between the hollow part and the fastener base. My invention is particularly useful in the attachment of molding strips to an automobile body due to the fact that through my invention the molding strip and fastener member are so securely fastened together as to prevent any chance of disengagement of the parts, or rattle, or other improper noise as a result of looseness of the parts.

Other objects and uses of my invention will be apparent from inspection of the drawings and specification hereinbelow set forth.

In the drawings, which illustrate preferred embodiments of my invention:

Fig. 8 is a view of an installation showing my second form of fastener member assembled with a molding strip with a portion of the strip cut away to show the relative position of the parts;

Fig. 9 is a top plan view of an installation showing a molding strip secured to a support by my second form of fastener member with a portion of the molding strip cut away to show the manner in which the fastener member engages the molding strip after the strip has been attached to the support;

Fig. 10 is a section taken along the line 10—10 of Fig. 8;

Fig. 11 is a section taken along the line 11—11 of Fig. 9;

Fig. 12 is a side view of my second form of fastener member per se;

Fig. 13 is an end view of my second form of fastener member per se; and

Fig. 14 is a bottom view of my second form of fastener member per se.

My invention, as illustrated in the accompanying drawings, relates particularly, though not exclusively, to a fastener secured installation in which hollow parts, such as molding strips and the like, are quickly and easily attached to a supporting structure, such as an automobile body, by means of my improved fastener member.

Figure 1:
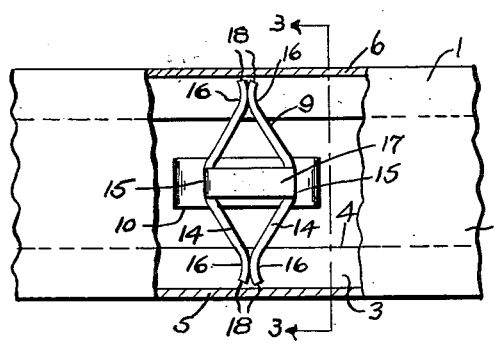
Fig. 1 is a top plan view of a molding strip showing one form of my improved fastener member assembled therewith with a portion of the molding strip cut away to show the relative positions of the parts.
Figure 2:
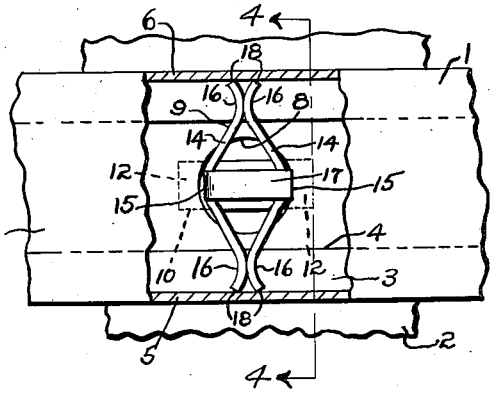
Fig. 2 is a top view of an installation showing a molding strip secured to a support by my first form of fastener member with a portion of the molding strip cut away to show the manner in which the fastener member is engaged with the molding strip after the strip has been attached to the support.
Figure 3:
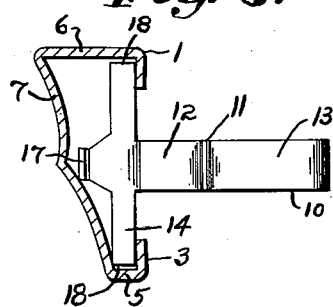
Fig. 3 is a section taken along the line 3—3 of Fig. 1.
Figure 4:
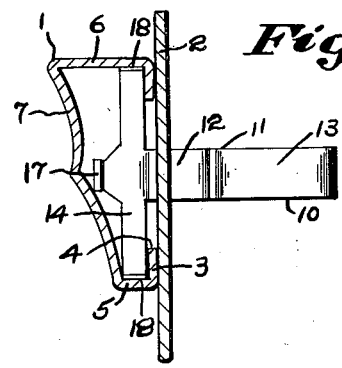
Fig. 4 is a section taken along the line 4—4 of Fig. 2.
Figure 5:
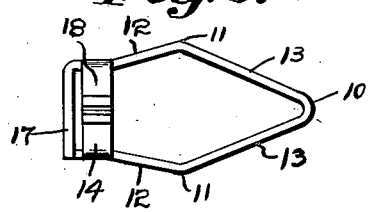
Fig. 5 is an end view of my first form of fastener member per se.

Referring to the drawings, the particular parts chosen to illustrate the use of the two preferred forms of my fastener member include a hollow molding 1, such as is now frequently used on the bodies of automobiles and elsewhere, and a relatively thin support 2 (Figs. 2 and 4). It should be understood, however, that my improved fasteners may be satisfactorily used for fastening other parts together than those specifically illustrated in the drawings. The molding strip 1 is of the type having a bottom wall 3 with an aperture 4 running longitudinally thereof. My preferred form of molding strip has upstanding spaced side walls 5 and 6 extending from the wall 3. The side walls 5 and 6 are of unequal length and support an inclined top wall 7 enclosing the side of the molding strip opposite the bottom wall 3. The supporting structure 2, which is preferably of thin metal material, has an aperture 8 therein (Fig. 2) to receive a stud means of the fastener member.

Referring to my first form of fastener member illustrated in Figs. 1-7 of the drawings, I have shown one preferably made of one-piece spring metal. In my preferred construction the fastener comprises a base portion 9 adapted to be seated within the hollow body of the molding strip 1 and a stud means 10 extending beneath the base for passage through the aperture 8 of the support 2 to secure the molding strip to the support. The stud means 10, in my preferred form, comprises a pair of oppositely-disposed contractible and expansible legs 11—11 joined at their ends away from the base 9. The legs 11—11 have portions 12—12 diverging from the base 9 and portions 13—13 converging toward their joined ends, as most clearly shown in Fig. 5. Thus the diverging and converging portions provide shoulders for engaging material of the supporting structure 2 adjacent the aperture 8. The distance between portions of the diverging portions 12—12 of the legs 11—11, disposed within the aperture 8 adapted to engage the walls thereof when the stud means has been finally secured to the support, is normally greater than the diameter of the aperture 8 whereby the legs 11—11 are contracted by the walls of the aperture when the stud is in fastened engagement with the support.

Figure 6:
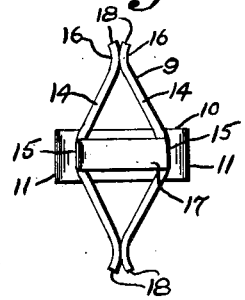
Fig. 6 is a top view of my first form of fastener member per se.
Figure 7:
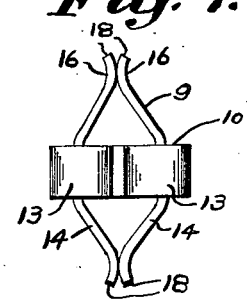
Fig. 7 is a bottom view of my first form of fastener member per se.

The base 9, the construction of which is an important feature of my invention, comprises yieldable parts in the form of arms 14—14 integrally joined at substantially their mid-portions to respective ends of the legs 11—11 opposed to their joined ends so that each leg, together with the respective arm 14, forms a substantially T-shaped portion, as most clearly shown in Fig. 6. The arms 14—14 are normally bowed at their points of junction 15 with the respective legs 11—11 and inner broad surfaces of the arms face each other, as most clearly shown in Fig. 1. The arms 14—14 have abuttable portions 16—16 at opposed ends of the base 9 which cooperate to expand or elongate the arms when inward pressure is exerted upon the bowed portions 15—15 of the arms, as will be hereinafter more fully described. A bridge portion 17, having one of its ends integrally joined to one of the arms 14 and its other end free, may be positioned above the base transversely of the arms 14—14 so as to space the arms from the top side 7 of the molding strip. The bridge portion 17 is particularly adapted to aid easy insertion of the base into engagement with the molding strip.

In assembling the parts of my installation, the base 9 of the fastener member is first disposed within the molding strip in transverse relation to the opening 4. This act may be accomplished either by placing the base within the molding at one end thereof and sliding the base longitudinally of the molding into proper position or by turning the base through the elongated aperture 4 of the bottom wall 3. When the base 9 is disposed within the molding, the outermost free ends 18—18 of the arms 14—14 are preferably spaced slightly from the side walls 5 and 6 of the molding, as most clearly shown in Figs. 1 and 3. The molding strip may now be secured to the supporting structure 2 through snapping the legs 11—11 of the fastener member through the aperture 8 of the support so as to engage the diverging portions 12—12 of the legs behind the support in a manner well known in the art. As a result of the fact that those portions of the diverging portions 12—12 which engage the walls of the aperture 8 are normally a greater distance apart than the diameter of the aperture 8, the legs will be contracted when disposed in final attached position within the aperture 8 with the result that the bowed portions 15—15 of the arms of the base 9 are moved toward each other. As the bowed portions 15—15 move toward each other, the arms tend to straighten due to the fact that the portions 16—16 at opposed ends of each of the arms are supported by respective portions 16—16 at opposite ends of the other of the arms with the result that the arms are expanded or elongated so as to move the free ends 18 of the arms into biting engagement with the side walls 5 and 6 of the molding, as most clearly shown in Figs. 2 and 4. Thus attachment of the molding to the support effects a firm fastening engagement between the molding and the base of the fastener member with the result that there is no chance for detachment of the molding from the base or relative looseness between the parts.

My second form of fastener member, shown in Figs. 8-14, is a modified construction of my first form of fastener member and similarly provides a base having parts adapted to grip the walls of the hollow part when the stud of the fastener is engaged with the support so as to provide firm fastening engagement between the fastener and the molding strip.

Referring to the second form of my fastener member, I have chosen to illustrate its use with an installation which is identical in form and shape with the installation shown in connection with my first form of fastener.

My second form of fastener member comprises a base 19 assembled within the molding 1 in the manner of the base 9 of my first form of fastener member and a stud portion 20 extending beneath the base for snap fastener engagement with the support 2 through the aperture 8. The stud 20 is similar in form to the stud 9 of my first form of fastener and provides a pair of opposed yieldable legs 21—21 joined at their ends away from the base 19 and providing portions 22—22 diverging from the base 19 and portions 23—23 converging to the joined ends of the legs.

The base 19 of my second form of fastener member comprises yieldable parts in the form of arms 24—24 which are joined at their mid-portions to the respective legs 21—21 and are distinguishable in form from the arms 14—14 of my first form of fastener member in that normally they are substantially straight. The arms are normally disposed in parallel relation with their inner broad surfaces facing each other, as most clearly shown in Figs. 8 and 14. A pair of abuttable portions are provided at opposed ends of the base 19 which, in my preferred form, comprise inwardly-extending portions 25—25 formed integral with the lower edges of the arms 24—24 at their ends and upstanding abuttable ears 26—26.

The ears 26—26 are formed integral with inner edges of respective portions 25—25 and preferably diverge from abuttable edges 27—27 which are disposed most remotely from the center of the base toward the other end of the base. The edges 27—27 of each pair of abuttable portions are disposed substantially tangent to a line connecting outermost free ends of the arms 24 at respective ends of the base. Each of the arms 24 may have an upstanding portion 28 integral with an upper edge of the arm at one end of the arm so as to engage the inner surface of the inclined top wall 7 of the molding at points most remote from the bottom wall 3 so as to prevent relative play between the parts.

The base 19 of my second form of fastener member is assembled with the molding 1 in a similar manner to the base 9 of my first form of fastener whereby it is supported by the bottom 3 of the molding and expands transversely of the opening 4. When the base is in this position, the contiguous edges 27—27 of each pair of abuttable portions are preferably spaced slightly from the respective side walls 5 and 6 of the molding 1, as most clearly shown in Figs. 8 and 10. When the stud 20 of the fastener member is disposed in final attached position within the aperture 8 of the support 2, the wall of the aperture 8 contracts the diverging portions 22—22 of the stud in the manner in which the diverging portions 12—12 of my first form of fastener member are contracted by the wall of the aperture thus tending to force the arms 24—24 toward each other. As a result of the fact that inward movement of the arms at opposed ends thereof is prevented by the contiguous relation of the edges 27—27 of the abuttable portions, the inward force resulting from contraction of the legs 21—21 acts to bow the arms inwardly slightly at their centers and outwardly at their ends, as most clearly shown in Fig. 9, thus forcing the pair of contiguous edges 27—27 at each end of the base outwardly into biting engagement with the walls 5 and 6 of the molding.

Although I have illustrated and described preferred forms of my invention, I do not wish to be limited thereby because the scope of my invention is best defined in the following claims.

I claim:

1. A fastener member comprising a base adapted to be seated within a hollow part and a pair of shouldered yieldable legs extending beneath said base and joined at their ends away from said base, said legs being contractible by the walls surrounding an opening of a support, and said base comprising a pair of yieldable arms integral with the free ends of said respective legs, said arms substantially facing each other and having portions at opposed ends of said base in abutting relation during said contraction of said legs to expand said base whereby portions thereof engage the sides of said hollow part to secure firmly said hollow part thereto.

2. A fastener member comprising a base adapted to be seated within a hollow part and a pair of shouldered yieldable legs extending beneath said base and joined at their ends away from said base, said legs being contractible by the walls surrounding an opening of a support, and said base comprising a pair of yieldable arms integral with the free ends of said respective legs, said arms substantially facing each other and being bowed outwardly at their centers, and said arms having portions at opposite ends in abutting relation during said contraction of said legs to lengthen said arms whereby the free ends of said arms engage said hollow part to secure firmly said hollow part thereto.

3. A fastener member comprising a base adapted to be seated within a hollow part and a pair of shouldered yieldable legs extending beneath said base and joined at their ends away from said base, said legs being contractible by the walls surrounding an opening of a support, and said base comprising a pair of yieldable arms integral with the free ends of said respective legs, said arms having opposed pairs of inwardly-extending portions at opposite ends and upstanding abuttable ears integral with inner edges of said inwardly-extending portions, the ears of each of said pairs of inwardly-extending portions having contiguous edges tangent to a line connecting the free ends of said arms and the ears of each of said pairs of inwardly-extending portions diverging from their contiguous edges toward the other end of said base, said contiguous edges being movable outwardly upon said contraction of said legs to engage said hollow part to secure firmly said hollow part thereto.

4. A fastener installation comprising an apertured support, a hollow part having a continuous longitudinal aperture and a fastener member having a base seated within said part and shouldered legs extending beneath said base through an aperture of said support for securing said hollow part to said support, and said base comprising yieldable arms integral with said respective legs and having portions at opposed ends of the base in abutting relation during said contraction of said legs to lengthen said arms whereby portions thereof engage said hollow part.

DIDRICK DYRESEN.